United States Patent
Boyle et al.

(10) Patent No.: US 8,090,750 B2
(45) Date of Patent: Jan. 3, 2012

(54) PROMPTING OF AN END USER WITH COMMANDS

(75) Inventors: Peter Currie Boyle, Burnaby (CA); Yu Zhang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 12/346,143

(22) Filed: Dec. 30, 2008

(65) Prior Publication Data

US 2010/0169291 A1  Jul. 1, 2010

(51) Int. Cl.
G06F 7/00 (2006.01)
G06F 17/30 (2006.01)

(52) U.S. Cl. .................................. 707/804; 707/812
(58) Field of Classification Search .......... 707/802–804, 707/812, 809
See application file for complete search history.

(56) References Cited

U.S. PATENT DOCUMENTS

| | | | |
|---|---|---|---|
| 5,335,342 A | 8/1994 | Pope et al. | |
| 5,390,281 A | 2/1995 | Luciw et al. | |
| 5,560,011 A | 9/1996 | Uyama | |
| 6,226,785 B1 | 5/2001 | Peterson et al. | |
| 6,260,035 B1 | 7/2001 | Horvitz et al. | |
| 6,262,730 B1 | 7/2001 | Horvitz et al. | |
| 6,278,977 B1 | 8/2001 | Agrawal et al. | |
| 6,340,977 B1 | 1/2002 | Lui et al. | |
| 6,370,648 B1 * | 4/2002 | Diep | 726/22 |
| 6,690,392 B1 * | 2/2004 | Wugoski | 715/744 |
| 6,792,609 B1 | 9/2004 | MacPhail et al. | |
| 7,421,654 B2 * | 9/2008 | Wugoski | 715/704 |
| 7,504,931 B2 * | 3/2009 | Nguyen | 340/426.36 |
| 7,669,084 B2 * | 2/2010 | Duron et al. | 714/30 |
| 7,685,342 B2 * | 3/2010 | Shiraki et al. | 710/74 |
| 7,856,294 B2 * | 12/2010 | Van Gaasbeck et al. | 701/3 |

(Continued)

FOREIGN PATENT DOCUMENTS

WO WO98/03907 A2 1/1998

OTHER PUBLICATIONS

Curve Fitting Toolbox User's Guide(TM). TheMathWorks(TM). Copyright 2001-2008. [online]. 294 pages. [retrieved Oct. 17, 2008]. Retrieved from the Internet:< URL: http://www.mathworks.com/access/helpdesk/help/pdf_doc/curvefit/curvefit.pdf>.

(Continued)

*Primary Examiner* — Don Wong
*Assistant Examiner* — Merilyn P Nguyen
(74) *Attorney, Agent, or Firm* — Schmeiser, Olsen & Watts; John Pivnichny

(57) ABSTRACT

A method and an associated computer program product, computing system, and process for supporting computer infrastructure for prompting an end user with a preferred sequence of commands which performs an activity in a least number of inputs. The method begins by monitoring a computer system for both input received from the end user and state transitions as a result of the computer receiving the end user input. The input received facilitates an activity the end user whishes to execute; the state transitions being the result of executing the activity. Next, defining the input received from the end user in a meaningful way. Then comparing the input received with at least one other command sequences that accomplish the same activity as the end user's input. Finally, prompting the end user with a preferred sequence of commands which performs the activity with the least number of inputs possible.

24 Claims, 2 Drawing Sheets

U.S. PATENT DOCUMENTS

| | | | |
|---|---|---|---|
| 2006/0015597 A1 | 1/2006 | Scott et al. | |
| 2006/0184410 A1 | 8/2006 | Ramamurthy et al. | |
| 2007/0198317 A1 | 8/2007 | Harthcryde et al. | |
| 2008/0005490 A1* | 1/2008 | Shiraki et al. | 711/147 |
| 2008/0115137 A1* | 5/2008 | Gower et al. | 718/102 |
| 2008/0177623 A1* | 7/2008 | Fritsch et al. | 705/11 |

OTHER PUBLICATIONS

Efstathiou, C. E. SpecScan: A Utility Program for Generating Numerical Data from Printed Forms of Spectra and Other Signals. Journal of Chemical Education, 80, 1093-1094 (2003). [online]. 4 pages. [retrieved Oct. 17, 2008]. Retrieved from the Internet:< URL: http://jchemed.chem.wisc.edu/journal/issues/2003/Sep/abs1093_2.html>.

Friston et al. Principal Component Analysis Learning Algorithms: A Neurobiological Analysis. [online]. 2 pages. [retrieved Oct. 17, 2008]. Retrieved from the Internet:< URL: http://www.ncbi.nlm.nih.gov/entrez/query.fcgi?cmd=Retrieve&db=PubMed&list_uids=8265675&dopt=Abstract>.

Muller et al. Reverse Engineering: A Roadmap. [online]. 12 pages. [retrieved Oct. 17, 2008]. Retrieved from the Internet:< URL: http://www.cs.ucl.ac.uk/staff/A.Finkelstein/fose/finalmuller.pdf>.

Park et al. Locating Car License Plates Using Neural Networks. [online]. 1 page of abstract only. [retrieved Oct. 17, 2008]. Retrieved from the Internet:< URL: http://ieeexplore.ieee.org/xpl/freeabs_all.jsp?arnumber=803624>.

Salah et al. Scenariographer: A Tool for Reverse Engineering Class Usage Scenarios from Method Invocation Sequences. [online]. 10 pages. [retrieved Oct. 17, 2008]. Retrieved from the Internet:< URL: http://www.cs.drexel.edu/~filip/scenariographer.pdf>.

Scaife et al. External Cognition: How do Graphical Representations Work? [online]. 45 pages. [retrieved Oct. 17, 2008]. Retrieved from the Internet:< URL: http://citeseer.ist.psu.edu/cache/papers/cs/790/ftp:zSzzSzftp.cogs.susx.ac.ukzSzpubzSzreportszSzcsrpzSzcsrp335.pdf/scaife96external.pdf>.

Storey et al. Cognitive Design Elements to Support the Construction of a Mental Model During Software Visualization. [online]. 12 pages. [retrieved 10/1712008]. Retrieved from the Internet< URL: http://citeseer.ist.psu.edu/cache/papers/cs/13722/http:zSzzSzwww.csr.uvic.cazSz~mstoreyzSzpaperszSzwpc97.pdf/storey97cognitive.pdf>.

Walenstein, A. Cognitive Support in Software Engineering Tools: A Distributed Cognition Framework. Thesis. May 2002. [online]. 402 pages. [retrieved Oct. 17, 2008]. Retrieved from the Internet< URL: http://citeseer.ist.psu.edu/cache/papers/cs/26567/http:zSzzSzwww.cs.sfu.cazSz~walenstezSzpersonalzSzResearchzSzpubszSz2002may-u-sfu-scs-walenstein-phd.pdf/walenstein02cognitive.pdf>.

Walenstein, A. Developing the Designer's Toolkit with Software Comprehension Models. 1998 IEEE. Proceedings of 13th Conference on Automated Software Engineering ( ASE '98), Oct. 13-16, 1998. Hawaii. 4 pages.

Walenstein, A. Foundations of Cognitive Support: Toward Abstract Patterns of Usefulness. Proceedings of 14th Annual Conference on Design, Specification, and Verification of Interactive Systems (DSV-IS'2002), Rostock Germany, Jun. 12-15, 2002. 12 pages.

ClearImage Repair v5.5. Shareware River. [online]. 3 pages. [retrieved Dec. 30, 2008]. Retrieved from the Internet< URL: http://www.sharewareriver.com/products/6116.htm>.

Advanced PDF to HTML Converter v 1.9.2. Shareware River. [online]. 2 pages. [retrieved Dec. 30, 2008]. Retrieved from the Internet:< URL: http://www.sharewareriver.com/products/19241.htm>.

Maulsby, David, et al., Learning agents: from user study to implementation; Unknown Country; Unknown Publication; 13 pages.

Maulsby, David, et al., Cima: an interactive concept learning system for end-user applications; Unknown Country; Unknown Publication; 22 pages.

IBM, A method and process for assessing the way a system is used and then mapping that usage to a new system in order to speed adoption; Jun. 17, 2009; IP.com; IP.com No. IPCOM000184263D; 2 pages.

Walenstein, Andrew; Developing the Designer's Toolkit with software Comprehension Models; published in the 13th Conference on Automated Software Engineering (AsSE '98) Oct. 13-16, 1998, Honolulu, Hawaii; 4 pages.

Walenstein, Andrew; Cognitive Support in Software Engineering Tools: A Distributed Cognition Framework; Doctoral Candidate Thesis; Simon Fraser University, May 2002; 402 pages.

Dean, Tom; Course Description and Outline; ELEC 875-Design Recovery and Automated Evolution; Queen's University; Kingston, Ontario, Canada; Unknown Date; [retrieved on Jun. 24, 2011] Retrieved from the Internet: URL:http://web.archive.org/web/20020823223004/http://www.ece.queensu.ca/hpages/courses/elec875; 6 pages.

Walenstein, Andrew; Foundations of Cognitive Support: Toward Abstract Patterns of Usefulness; Published in Proceedings of the 14th Annual Conference on Design, Specification, and Verification of Interactive Systems (DSV-IS'2002), Rostock Germany, Jun. 12-15, 2002; 12 pages.

Storey, M.-A.D., et al.; Cognitive Design Elements to Support the Construction of a Mental Model during Software Visualization; Unknown Publisher; Unknown Country; Unknown Date; 12 pages.

Scaife, Mike, et al.; External Cognition: how do Graphical Representations work? Unknown Publisher; Unknown Country; Unknown Date; 45 pages.

Computer supported cooperative work; Wikipedia; last modified May 15, 2011; [retrieved on Jun. 24, 2011]; Retrieved from the Internet: URL: http://en.wikipedia.org/wiki/CSCW.

Activity theory; Wikipedia; last modified Jun. 18, 2011; [retrieved on Jun. 24, 2011]; Retrieved from the Internet: URL: http://en.wikipedia.org/wiki/Activity_theory.

Muller, Hausi, et al.; Reverse Engineering: A Roadmap; Future of Software Engineering; Limerick, Ireland; Unknown Date; pp. 47-60.

Efstathiou, Constantinos E; SpecScan: A Utility Program for Generating Numerical Data from Printed Forms of Spectra or Other Signals; JChemEd.chem.wisc.edu; vol. 80, No. 9; Sep. 2003; Madison, Wisconsin, United State; pp. 1093-1094.

ClearImage Repair v5.5; Product Description; Shareware River; [retrieved on Jun. 27, 2011]; Retrieved from the Internet: URL: http://www.sharerivercom/product.php?id=6116; 2 pages.

Friston, KJ, et al., Principal component analysis learning algorithms: a neurobiological analysis; Proc Biol Sci, Oct. 22, 1993; 254(1339); 47-54; Abstract [retrieved on Jun. 27, 2011]; Retrieved from the Internet: URL: http://www.ncbi.nlm.nih.gov/pubmed/8265675?dopt=Abstract; 1 page.

INTRAPDF; Advanced PDF to HTML converter v1.9.2; Product Description; Shareware River [retrieved on Jun. 24, 2011]; Retrieved from the Internet; URL: http://www.sharewarerivercom/product.php?id=19241; 2 pages.

Curve Fitting Toolbox 3.0, Fit curves and surfaces to data using regression, interpolation, and smoothing; Product Description; Mathworks; 18 pages.

Giele, Eelco L.W.; Computer methods for semi-automatic MR renogram determination; Thesis; Eindhove: Technische Universiteit Eindhoven, Netherlands; 2002; 133 pages.

Park, S.H., et al.; Locating car license plates using neural networks; Electronics Letters; vol. 35, No. 17, pp. 1475-1477; Aug. 19, 1999.

* cited by examiner

PROMPTING OF AN END USER WITH COMMANDS

BACKGROUND OF THE INVENTION

The present invention relates generally to computer process optimization, and more particularly to identifying an alternative and shorter method for performing a given computer process.

Knowledge regarding the successful execution of a computer process resides primarily within the mind of an end user. Conventionally, learned approaches, short cuts, problem determination methods, etc., are rarely documented and/or shared with others. As a result, each end user must develop their own approaches, short cuts, solutions, etc.

Consequently, each end user may never learn and/or decipher the optimum method for performing a process using the least number of inputs. Additionally, the information that is available to an end user is often incomplete, inaccurate, outdated, and must be sought out by the end user.

SUMMARY OF THE INVENTION

The present invention provides a method and an associated computer program product, computing system, and process for supporting computer infrastructure for prompting an end user with a preferred sequence of commands which performs an activity in a least number of inputs. The method comprises:

monitoring a computer system for at least one command which performs said activity, said at least one command being performed by said end user;

monitoring for at least one state transition residing in said computer system for change, said change being a result of said computer system receiving said at least one command;

in response to identifying said at least one state transition change from said monitoring for said at least one state transition, providing a first definition for said at least one command, said first definition being a function of said at least one command;

comparing said at least one command to at least one sequence of commands residing in a database and having a second definition matching said first definition; and prompting said end user with said preferred sequence of command which performs said activity in said least number of inputs, said preferred sequence of commands being identified as a result of said comparing.

DETAILED DESCRIPTION OF THE DRAWINGS

Definitions

The term 'activity' as used herein means a sequence of commands entered into a computer system by an end user in a particular sequence which collectively perform a single action.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
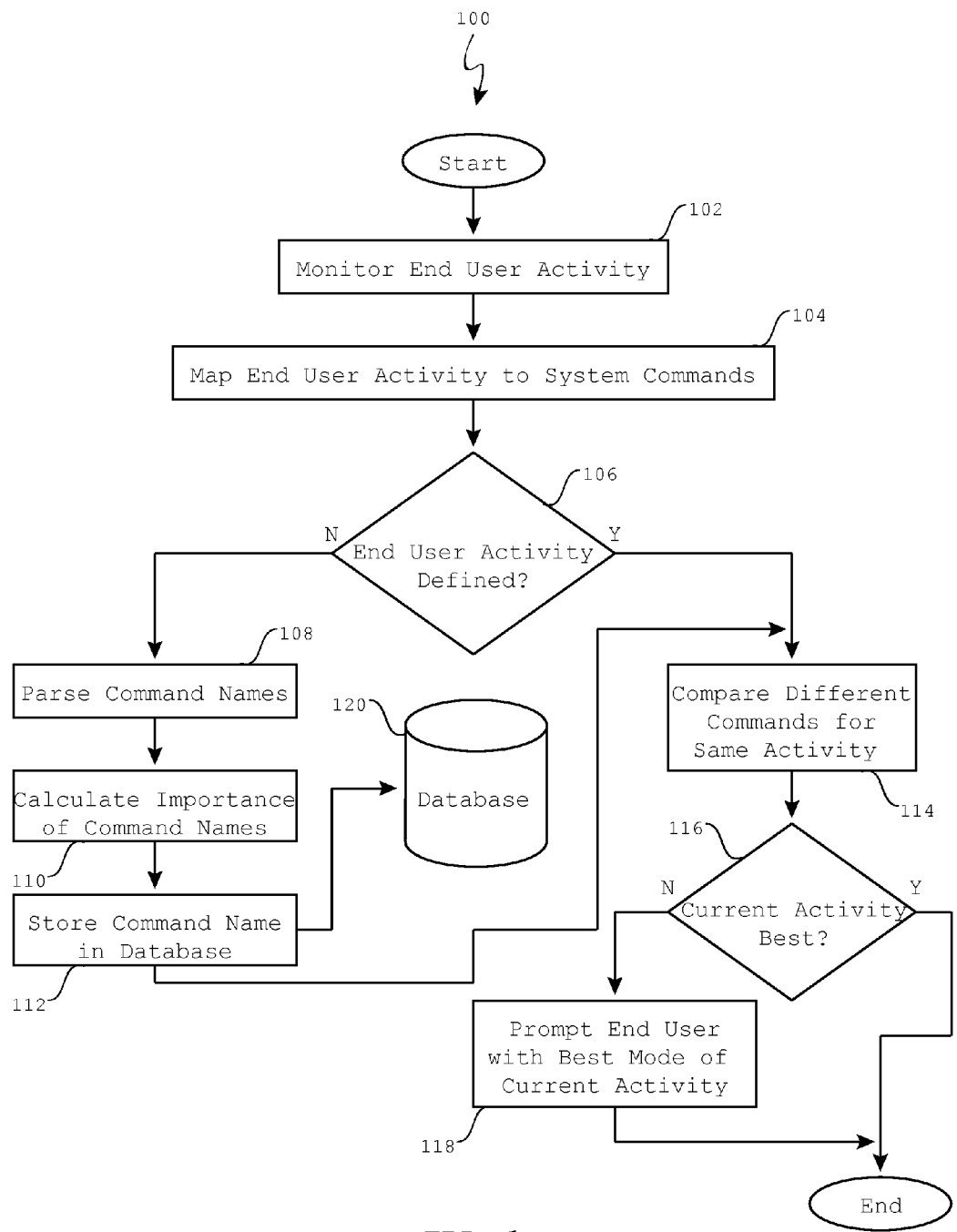
FIG. 1 illustrates a method for prompting an end user with a preferred sequence of commands which performs an activity in a least number of inputs, in accordance with embodiments of the present invention.

FIG. 1 illustrates a method 100 for prompting an end user with a preferred sequence of commands which performs an activity in a least number of inputs, in accordance with embodiments of the present invention. The method 100 begins with step 102 which comprises monitoring an end user's activities on a computer.

In one embodiment of the present invention, step 102 monitors and logs to a database 120 all keyboard entries and mouse movements performed by said end user. After completion of step 102, the method 100 continues with step 104 which comprises mapping the end user's activity to internal computer system states.

Step 104 comprises mapping the end user's activity monitored pursuant to step 102 to internal computer system states. In one embodiment of the present invention, step 104 utilizes an internal state monitor to check the computer system's internal variables and map each variable to an internal state. A sequence of end user commands may cause the computer system to move from one internal state to another.

For example, the sequence of: 1) highlight characters/images; 2) pressing <Ctrl>; and 3) pressing <c> results in the highlighted characters/images being copied to a computer system's random access memory (RAM). The computer system's internal state changed in response to the sequence entered; RAM received and stored the highlighted characters/images.

Some state transitions are of little importance to the present invention (i.e. opening an application' closing an application, switching between applications, etc.) while other some transitions imply the completion of a command or the completion of an activity. These transitions are used to determine and extract successful command sequences from the end user's activity.

After mapping the end user activity to internal computer system states, step 104 ends and the method 100 continues with step 106 which comprises determining whether the end user's activity was previously defined. The determination as to when an end user completes an activity may be decided, inter alia, the number of commands in the sequence performed by the end user, the length of time accrued after the last command entered by the end user, the number of internal states (see infra) that change in response to the commands entered by the end user, etc.

In one embodiment of the present invention, step 106 compares the captured end user activity against known command sequences stored in the database 120. The database 120 comprises a plurality of activities, either captured pursuant to step 102 or pre-loaded prior to the first instance of the method 100, along with a definition corresponding to each activity stored therein.

If within the database 120 resides the activity captured pursuant to step 102, step 106 returns a response 'yes' and the method 100 continues with step 114 which comprises comparing the different command sequences which perform the activity the end user just entered. The different command sequences which perform the activity entered by the end user reside in the database 120 and each have unique command sequences.

However, if the activity capture pursuant to step 102 does not reside within the database 120, step 106 returns a response 'no' and the method 100 continues with step 108 which comprises parsing the command sequence in the entered activity for a definition.

Step 108 comprises parsing the command sequence in the entered activity captured pursuant to step 102 for a definition. In one embodiment of the present invention step 108 defines the activity (i.e. command sequence) performed by the end user by, inter alia, the end user through a prompt and response, a system administrator prior to monitoring the end user's activity, etc. After completion of step 108, the method 100 continues with step 112 which comprises storing the definition in the database 120.

In an alternative embodiment of the present invention, step 108 utilizes a language parsing engine to extract meaningful keywords from each command in the activity entered by the end user. For example, in the sequence: 1) highlight characters/images; 2) pressing <Ctrl>; and 3) pressing <c>; and 4) copying the highlighted characters/images to RAM; meaningful keywords may be 'highlight', 'Ctrl', 'C', and 'Copy'.

After completion of step 108, the method 100 continues with step 110 which comprises calculating the importance of the command names parsed pursuant to step 108.

In one embodiment of the present invention step 110 utilizes a digital dictionary (i.e. WordNet) to determine the importance of each command name corresponding to a command in the activity performed by the end user. Repetitive and less important command names are removed and what remains is the definition used by the method 100 to define the activity performed by the end user. In one embodiment of the present invention, the importance, greater and/or lesser, for each command name is determined by the word's depth in a semantic hierarchical tree of dictionary words.

For example, with respect to the keywords 'highlight', 'Ctrl', 'C', and 'Copy', the keywords 'Ctrl' and 'C' convey little meaning to the activity performed and would be removed by step 110. Similarly, 'highlight' is of less importance to the keyword 'Copy' and would also likely be removed by step 110. The keyword which remains, 'Copy' would become the definition corresponding to the activity performed by the end user pursuant to step 102.

After completion of step 110, the method 100 continues with step 112 which comprises storing the definition in the database 120.

In one embodiment of the present invention, step 112 stores the definition determined pursuant to steps 108 and 110 in the database 120. Moreover, step 112 correlates the determined definition with the activity entered by the end user. Thus, the database 120 receives the definition and activity and therein stores the information for comparisons. After completion of step 112, the method 100 continues with step 114 which comprises comparing different command sequences which perform the same activity captured pursuant to step 102.

In one embodiment of the present invention, step 114 locates all command sequences residing in the database 120 which correlate to the definition assigned to the activity performed by the end user pursuant to step 102. The located command sequences all perform the same activity as the activity captured pursuant to step 102, however each located command sequence performs the activity by means of different commands and/or sequences.

After locating all relevant command sequences, step 114 compares each command sequence to identify an optimum sequence to perform the activity. An optimum sequence may be, inter alia, the sequence having the least number of commands entered by the end user, the sequence having the least number of internal state transitions performed, the sequence having the least number of keyboard keys being typed by the end user, the sequence having the greatest number of keyboard keys being typed by the end user, etc. An administrator may determine the decision as to which level of optimum is used by the method 100 prior to the first instance of the method 100. The different command sequences which can perform the activity executed by the end user may also be rated numerically for use with respect to step 116, infra.

For example, step 114 found an alternative command sequence for 'Copy', perhaps the sequence of: 1) highlight characters/images; 2) press 'Edit'; 3) press 'Copy'; and 4) write the highlighted characters/images to RAM. Step 114 can compare this command sequence for the activity 'Copy' with the sequence entered by the end user: 1) highlight characters/images; 2) pressing <Ctrl>; and 3) pressing <c>; and 4) write the highlighted characters/images to RAM. Since both command sequences contain four (4) steps, the number of steps would not be a proper indication of which command sequence is optimum. If the greatest number of keyboard keys typed is the metric, the command sequence entered by the end user would be optimum for the command sequence found in the database 120 contains no keyboard key typing. Similarly, if the least number of keyboard keys typed is the metric, the command sequence found in the database 120 would be optimum for it contains no keyboard use at all.

After completion of step 114, the method 100 continues with step 116 which comprises determining whether the command sequence entered by the end user pursuant to step 102 is the optimum command sequence to perform the activity correlating to said entered sequence. In one embodiment of the present invention, step 116 compares the rating associated with the command sequence entered by the end user and the highest rated command sequence found in the database 120 corresponding to said activity.

If the rating for the command sequence entered by the end user pursuant to step 102 is equal to or greater than the highest rated command sequence found in the database 120 corresponding to said activity, step 116 returns a response 'yes' and the method 100 ends. However, If the rating for the command sequence entered by the end user pursuant to step 102 is less than the highest rated command sequence found in the database 120 corresponding to said activity, step 116 returns a response 'no' and the method 100 continues with step 118 which comprises prompting the end user with the higher rated command sequence found in the database 120 corresponding to said activity.

Figure 2:
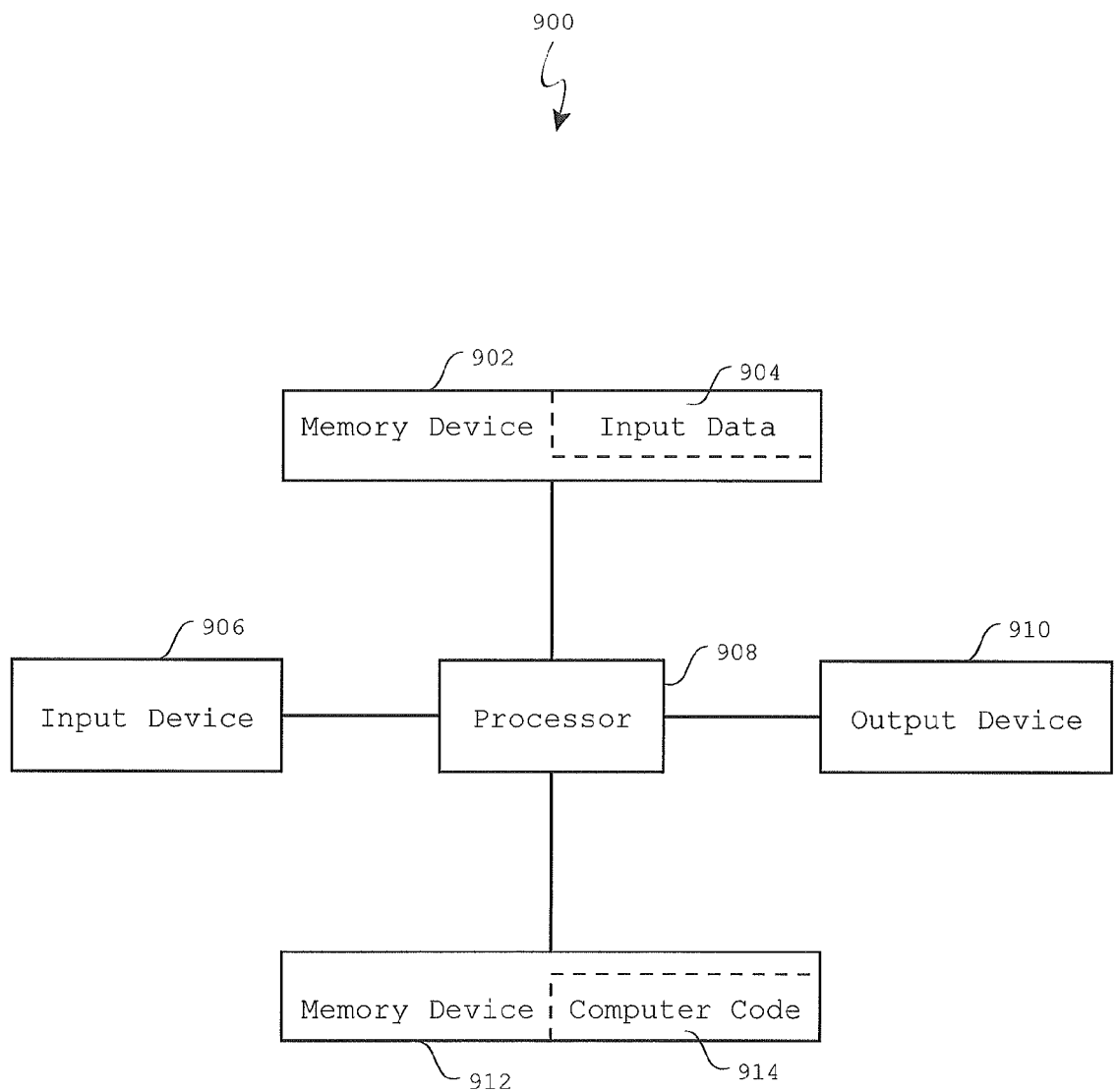
FIG. 2 illustrates a computer system which may facilitate a method for prompting an end user with a preferred sequence of commands which performs an activity in a least number of inputs, in accordance with embodiments of the present invention.

In one embodiment of the present invention, step 118 sends a prompt to the end user be means of an output device 910 (see FIG. 2, infra). The prompt comprises both the definition of the activity the end user entered pursuant to step 102 along with the command sequence having the higher rating and residing in the database 120. The result of the prompt being sent to the end user is that said end user receives information from the computer system regarding how to perform the previously executed activity more efficiently and/or with less commands. After completion of step 118, the method 100 ends.

FIG. 2 illustrates a computer system 900 which may facilitate a method for prompting an end user with a preferred sequence of commands which performs an activity in a least number of inputs, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, random access memory (RAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for prompting an end user with a preferred sequence of commands which performs an activity in a least number of inputs according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 2) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for prompting an end user with a preferred sequence of commands which performs an activity in a least number of inputs. Thus, the present invention discloses a process for supporting computer infrastructure, comprising integrating, hosting, maintaining and deploying computer-readable code into a computing system (e.g., computing system 900), wherein the code in combination with the computing system is capable of performing a method for prompting an end user with a preferred sequence of commands which performs an activity in a least number of inputs.

In another embodiment, the invention provides a business method that performs the process steps of the invention on a subscription, advertising and/or fee basis. That is, a service provider, such as a Solution Integrator, can offer to create, maintain, support, etc. a process for prompting an end user with a preferred sequence of commands which performs an activity in a least number of inputs. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 2 shows the computer system 900 as a particular configuration of hardware and software, any configuration of hardware and software, as would be known to a person of ordinary skill in the art, may be utilized for the purposes stated supra in conjunction with the particular computer system 900 of FIG. 2. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for prompting an end user with a preferred sequence of commands which performs an activity in a least number of inputs, said method comprising:
   monitoring a computer system for at least one command which performs said activity, said at least one command being performed by said end user;
   monitoring for at least one state transition residing in said computer system for change, said change being a result of said computer system receiving said at least one command;
   in response to identifying said at least one state transition change from said monitoring for said at least one state transition, providing a first definition for said at least one command, said first definition being a function of said at least one command;
   comparing said at least one command to at least one sequence of commands residing in a database and having a second definition matching said first definition; and
   prompting said end user with said preferred sequence of commands which performs said activity in said least number of inputs, said preferred sequence of commands being identified as a result of said comparing.

2. The method of claim 1, said providing said first definition further comprising:
   parsing at least one name from said at least one command, each name of said at least one name corresponding to a unique command of said at least one command;
   determining a value for each name of said at least one name, said value being a level in a hierarchical dictionary where each said name resides; and
   selecting as said first definition a name from said at least one name having a highest said level.

3. The method of claim 2, said providing said first definition further comprising:
   ascertaining whether said at least one command already resides in said database; and
   having determined from said ascertaining that said at least one command does not reside in said database, storing in said database said at least one command and said first definition, said first definition being correlated to said at least one command.

4. The method of claim 2, said providing said first definition further comprising:
   ascertaining whether said at least one command already resides in said database; and
   having determined from said ascertaining that said at least one command does reside in said database, storing in said database said first definition, said first definition being correlated to said at least one command.

5. The method of claim 1, said comparing further comprising:
   searching said database for said at least one sequence of commands having said second definition matching said first definition;

for each sequence of commands in said at least one sequence of commands, identifying a total number of inputs said end user must enter in order to perform said activity; and for each said sequence of commands in said at least one sequence of commands, comparing said total number of inputs with a number of inputs said end user entered for said at least one command; and identifying said preferred sequence of commands from said at least one command and said at least one sequence of commands, said preferred sequence of commands having a lowest total number of inputs said end user must enter to perform said activity.

6. The method of claim 1, each input of said least number of inputs being received from a device selected from the group consisting of a keyboard, a mouse, a keypad, a touchscreen, a voice recognition device, a sensor, a network interface card (NIC), a Voice/video over Internet Protocol (VOIP) adapter, a wireless adapter, a telephone adapter, and a dedicated circuit adapter.

7. A computer program product, comprising a computer-usable storage medium having a computer-readable program code stored therein, said computer-readable program code containing instructions that when executed by a processor of a computer system implement a method for prompting an end user with a preferred sequence of commands which performs an activity in a least number of inputs, said method comprising:

monitoring a computer system for at least one command which performs said activity, said at least one command being performed by said end user;

monitoring for at least one state transition residing in said computer system for change, said change being a result of said computer system receiving said at least one command;

in response to identifying said at least one state transition change from said monitoring for said at least one state transition, providing a first definition for said at least one command, said first definition being a function of said at least one command;

comparing said at least one command to at least one sequence of commands residing in a database and having a second definition matching said first definition; and prompting said end user with said preferred sequence of commands which performs said activity in said least number of inputs, said preferred sequence of commands being identified as a result of said comparing.

8. The computer program product of claim 7, said providing said first definition further comprising:

parsing at least one name from said at least one command, each name of said at least one name corresponding to a unique command of said at least one command;

determining a value for each name of said at least one name, said value being a level in a hierarchical dictionary where each said name resides; and selecting as said first definition a name from said at least one name having a highest said level.

9. The computer program product of claim 8, said providing said first definition further comprising:

ascertaining whether said at least one command already resides in said database; and having determined from said ascertaining that said at least one command does not reside in said database, storing in said database said at least one command and said first definition, said first definition being correlated to said at least one command.

10. The computer program product of claim 8, said providing said first definition further comprising:

ascertaining whether said at least one command already resides in said database; and having determined from said ascertaining that said at least one command does reside in said database, storing in said database said first definition, said first definition being correlated to said at least one command.

11. The computer program product of claim 7, said comparing further comprising:

searching said database for said at least one sequence of commands having said second definition matching said first definition;

for each sequence of commands in said at least one sequence of commands, identifying a total number of inputs said end user must enter in order to perform said activity; and for each said sequence of commands in said at least one sequence of commands, comparing said total number of inputs with a number of inputs said end user entered for said at least one command; and identifying said preferred sequence of commands from said at least one command and said at least one sequence of commands, said preferred sequence of commands having a lowest total number of inputs said end user must enter to perform said activity.

12. The computer program product of claim 7, each input of said least number of inputs being received from a device selected from the group consisting of a keyboard, a mouse, a keypad, a touchscreen, a voice recognition device, a sensor, a network interface card (NIC), a Voice/video over Internet Protocol (VOIP) adapter, a wireless adapter, a telephone adapter, and a dedicated circuit adapter.

13. A computing system comprising a processor coupled to a computer-readable memory unit, said memory unit comprising a software application, said software application comprising instruction that when executed by said processor, implement a method for prompting an end user with a preferred sequence of commands which performs an activity in a least number of inputs, said method comprising:

monitoring a computer system for at least one command which performs said activity, said at least one command being performed by said end user;

monitoring for at least one state transition residing in said computer system for change, said change being a result of said computer system receiving said at least one command;

in response to identifying said at least one state transition change from said monitoring for said at least one state transition, providing a first definition for said at least one command, said first definition being a function of said at least one command;

comparing said at least one command to at least one sequence of commands residing in a database and having a second definition matching said first definition; and prompting said end user with said preferred sequence of commands which performs said activity in said least number of inputs, said preferred sequence of commands being identified as a result of said comparing.

14. The computing system of claim 13, said providing said first definition further comprising:

parsing at least one name from said at least one command, each name of said at least one name corresponding to a unique command of said at least one command;

determining a value for each name of said at least one name, said value being a level in a hierarchical dictionary where each said name resides; and selecting as said first definition a name from said at least one name having a highest said level.

15. The computing system of claim 14, said providing said first definition further comprising:
ascertaining whether said at least one command already resides in said database; and
having determined from said ascertaining that said at least one command does not reside in said database, storing in said database said at least one command and said first definition, said first definition being correlated to said at least one command.

16. The computing system of claim 14, said providing said first definition further comprising:
ascertaining whether said at least one command already resides in said database; and
having determined from said ascertaining that said at least one command does reside in said database, storing in said database said first definition, said first definition being correlated to said at least one command.

17. The computing system of claim 13, said comparing further comprising:
searching said database for said at least one sequence of commands having said second definition matching said first definition;
for each sequence of commands in said at least one sequence of commands, identifying a total number of inputs said end user must enter in order to perform said activity; and
for each said sequence of commands in said at least one sequence of commands, comparing said total number of inputs with a number of inputs said end user entered for said at least one command; and
identifying said preferred sequence of commands from said at least one command and said at least one sequence of commands, said preferred sequence of commands having a lowest total number of inputs said end user must enter to perform said activity.

18. The computing system of claim 13, each input of said least number of inputs being received from a device selected from the group consisting of a keyboard, a mouse, a keypad, a touchscreen, a voice recognition device, a sensor, a network interface card (NIC), a Voice/video over Internet Protocol (VOIP) adapter, a wireless adapter, a telephone adapter, and a dedicated circuit adapter.

19. A process for supporting computer infrastructure, said process comprising providing at least one support service for at least one of creating, integrating, hosting, maintaining, and deploying computer-readable code in a computing system, wherein said code in combination with the computing system is capable of implementing a method for prompting an end user with a preferred sequence of commands which performs an activity in a least number of inputs, said method comprising:
monitoring a computer system for at least one command which performs said activity, said at least one command being performed by said end user;
monitoring for at least one state transition residing in said computer system for change, said change being a result of said computer system receiving said at least one command;
in response to identifying said at least one state transition change from said monitoring for said at least one state transition, providing a first definition for said at least one command, said first definition being a function of said at least one command;
comparing said at least one command to at least one sequence of commands residing in a database and having a second definition matching said first definition; and
prompting said end user with said preferred sequence of commands which performs said activity in said least number of inputs, said preferred sequence of commands being identified as a result of said comparing.

20. The process for supporting computer infrastructure of claim 19, said providing said first definition further comprising:
parsing at least one name from said at least one command, each name of said at least one name corresponding to a unique command of said at least one command;
determining a value for each name of said at least one name, said value being a level in a hierarchical dictionary where each said name resides; and
selecting as said first definition a name from said at least one name having a highest said level.

21. The process for supporting computer infrastructure of claim 20, said providing said first definition further comprising:
ascertaining whether said at least one command already resides in said database; and
having determined from said ascertaining that said at least one command does not reside in said database, storing in said database said at least one command and said first definition, said first definition being correlated to said at least one command.

22. The process for supporting computer infrastructure of claim 20, said providing said first definition further comprising:
ascertaining whether said at least one command already resides in said database; and
having determined from said ascertaining that said at least one command does reside in said database, storing in said database said first definition, said first definition being correlated to said at least one command.

23. The process for supporting computer infrastructure of claim 19, said comparing further comprising:
searching said database for said at least one sequence of commands having said second definition matching said first definition;
for each sequence of commands in said at least one sequence of commands, identifying a total number of inputs said end user must enter in order to perform said activity; and
for each said sequence of commands in said at least one sequence of commands, comparing said total number of inputs with a number of inputs said end user entered for said at least one command; and
identifying said preferred sequence of commands from said at least one command and said at least one sequence of commands, said preferred sequence of commands having a lowest total number of inputs said end user must enter to perform said activity.

24. The process for supporting computer infrastructure of claim 19, each input of said least number of inputs being received from a device selected from the group consisting of a keyboard, a mouse, a keypad, a touchscreen, a voice recognition device, a sensor, a network interface card (NIC), a Voice/video over Internet Protocol (VOIP) adapter, a wireless adapter, a telephone adapter, and a dedicated circuit adapter.

* * * * *